UNITED STATES PATENT OFFICE.

EDWARD SANDSTROM, OF WILMINGTON, DELAWARE, ASSIGNOR OF ONE-THIRD TO THOMAS G. HOLLAND, OF WILMINGTON, DELAWARE.

ROOT-DIGGING MACHINE.

SPECIFICATION forming part of Letters Patent No. 691,292, dated January 14, 1902.

Application filed March 28, 1901. Serial No. 53,205. (No model.)

*To all whom it may concern:*

Be it known that I, EDWARD SANDSTROM, a citizen of the United States of America, and a resident of Wilmington, county of Newcastle, State of Delaware, have invented certain new and useful Improvements in Beet and other Root Digging Machines, of which the following is a specification.

My invention consists, essentially, of two series of radiating spoon-shaped spades set edge to edge in circles and fronting each other in a wheeled carrier, which being drawn along the ground forces the spades into the ground on the sides of the rows of beets or other roots, respectively, and by means of suitable cams causes the spades to close on and grip the beets after entering the ground beside them and raise them in the ascending course of the spade along with more or less earth to the uppermost range of the spades, where they open and drop the beets into a screen, whereby the accompanying earth is separated and from which the beets are discharged into carriers and thereby delivered into a receptacle in which they are collected in quantities to be discharged in piles from time to time, as hereinafter more particularly described, reference being made to the accompanying drawings, in which—

Figure 1 is a plan view of my improved beet-digging machine with some parts in horizontal section. Fig. 2 is a longitudinal sectional elevation on line 2 2 of Fig. 1. Fig. 3 is a central vertical transverse section. Fig. 4 is a rear elevation, and Fig. 5 is a central longitudinal sectional elevation with a rear part of the machine broken off.

In the first place there is a horizontal frame comprising side members $a$, preferably in two parts with an intermediate space, one hind transverse member $b$, and a front transverse and intermediately offset member $c$, which frame carries at the middle of each side member an upright grooved post $e$, and the posts and the said side members $a$ have an outwardly-extended short axle $d$, by which said frame is mounted in a pair of carrying-wheels $f$. The upper ends of the posts $e$ are coupled by a truss $g$ for stability.

In the groove of each post $e$ is a vertically-shifting journal-box $h$, in which a shaft $i$, which extends from one to the other of the boxes, is mounted. This shaft carries near its center two series of spoon-shaped spades $j$, with their cutting edges pointing outward radially and set edgewise to each other in transverse planes of the shaft by means of rings $k$, supported on suitable arms $l$ of hubs $m$ of said shaft, the spades of each series being set fronting spades of the other series in radial lines of the axes, and they are pivoted by short arms $n$ to the supporting-rings $k$, so as to swing toward and from each other in longitudinal planes of the shaft. The shaft is normally carried at the lowest position of its boxes $h$ in the grooved posts, whereby it will be seen in Fig. 3 that the spades penetrate the ground through the effect of the weight on them, so as to be rotated as the machine is drawn along on the carrying-wheels. These two series of spades are thus to be forced into the ground each side of the rows of beets, respectively, as indicated in Fig. 3, and there is a stationary cam-ring $o$ behind each series of spades, which causes the spades to close on the beets after being thrust in the ground beside them and grip and raise them out and carry them to the upper range of the course, where said cams diverge at $r$ and permit the beets and the accompanying earth to fall out of the spades. Springs $p$ are employed to insure the opening of the spades in case the earth should pack and the spades should stick.

The spoon-bowl form of the spades is considerably less complete on the edge that approaches the beets when entering the ground than on the other edge for free entry of the beets between them. (See 46 on some of the spades.) On the other edge the bowl shape is entire for the more effective closing of the spade edges behind the beets for more certainty in lifting the beets out of the ground. In Fig. 1 it will be seen that the cams allow wide opening of the spades entering the ground; but when entered the cams close the spades to the extent shown in Fig. 3 and maintain them about the same until reaching the uppermost position or thereabout, where the notches $r$ allow the spades to open with a sudden shock, designed to shock the earth free, and the abrupt contractions $z$, following No. 691,293. Patented Jan. 14, 1902.
H. SCHEPKE.
APPARATUS FOR DISPENSING BEVERAGES.
(Application filed Feb. 20, 1901.)
(No Model.) 2 Sheets—Sheet 2.
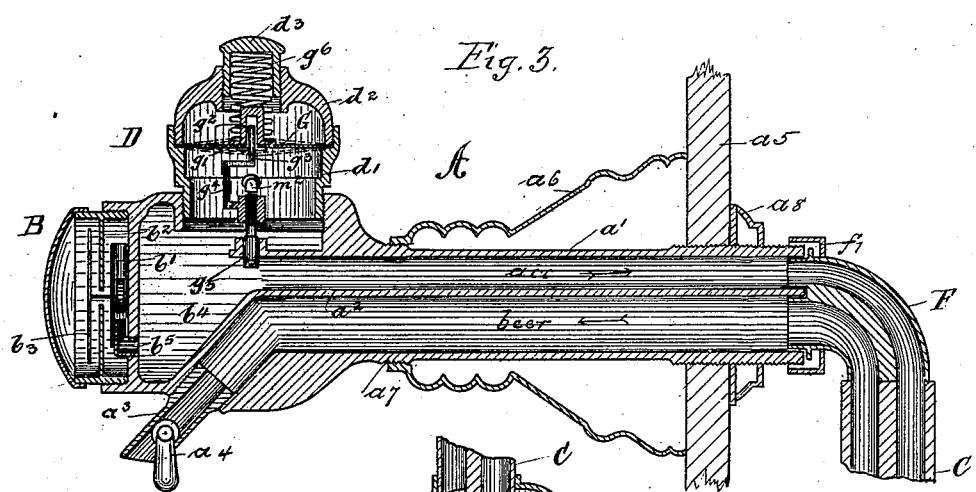
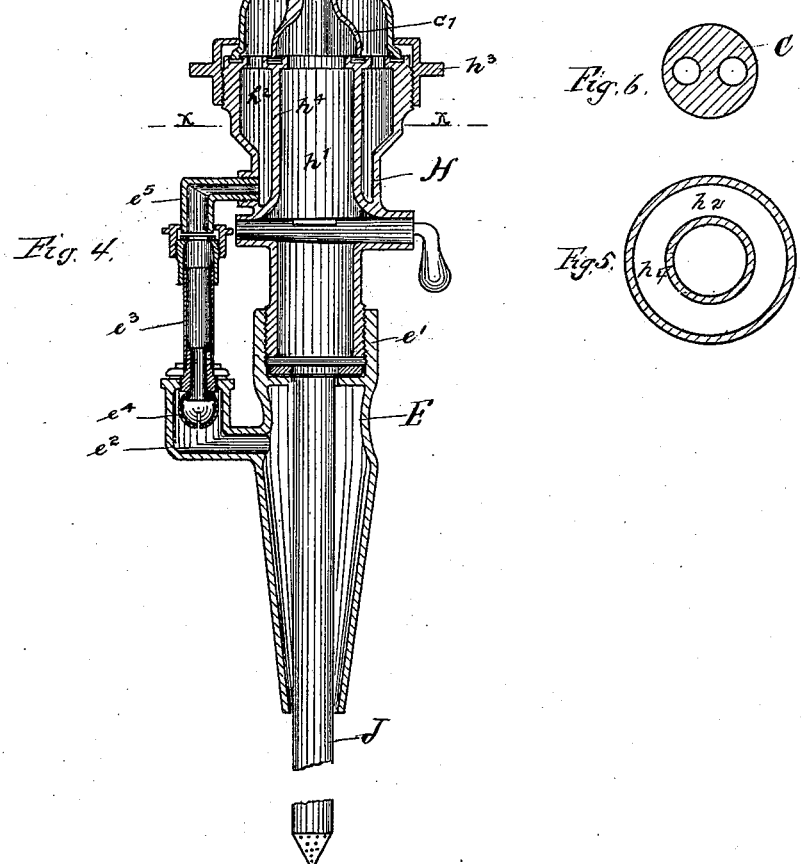
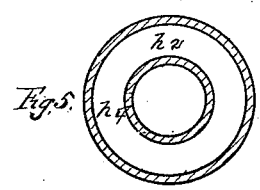

UNITED STATES PATENT OFFICE.

HERMAN SCHEPKE, OF CHICAGO, ILLINOIS.

APPARATUS FOR DISPENSING BEVERAGES.

SPECIFICATION forming part of Letters Patent No. 691,293, dated January 14, 1902.

Application filed February 20, 1901. Serial No. 48,105. (No model.)

*To all whom it may concern:*

Be it known that I, HERMAN SCHEPKE, a citizen of the United States, residing at Chicago, in the county of Cook and State of Illinois, have invented certain new and useful Improvements in Apparatus for Dispensing Beverages; and I do hereby declare the following to be a full, clear, and exact description of the invention, such as will enable others skilled in the art to which it appertains to make and use the same.

My invention relates to improvements in apparatus for dispensing beverages of the class in which air or carbonic-acid-gas pressure is used to force the liquids from their barrels, kegs, or other containers through pipes to delivery-faucets.

My improvements comprise as chief elements a novel form of faucet, having a channel for air and a channel for liquids, in which is embodied an air-regulating device for controlling the admission of the air to the faucet and a gage for indicating the pressure of the air on the liquid in the container, double-channeled pipe or tubing for conveying the air to the container from the faucet and the liquid from the container to the faucet, a bung having channels for the air and gas, and various liquid and air tight couplings for joining the several parts, all uniting to form a complete and compact form of liquid-distribution apparatus.

In this application I will describe and illustrate my invention as apparatus for dispensing beer, though I do not thereby wish to be understood as limiting it to such uses. In the systems of beer distribution in general use an outfit comprises an air pump and tank, an air-pressure gage, and an air-pressure regulator, interposed between the air-tank and the keg of beer. Faucets are connected with the kegs by pipes leading through an ice-box, whereby the beer is cooled before being drawn, and separate pipes connect the air-gage, regulator, and tank with the kegs. The gages are usually placed at inconvenient points, and the air-conveying pipes are exposed to the atmosphere of the saloon or cellar, so that the air when pumped over the beer is more or less warm. The multiplicity of pipes and parts makes the material and installation of such systems expensive and troublesome and causes the cutting of numerous openings in the floors and partitions.

The chief object of my invention is to improve and simplify the parts and reduce their number and to arrange them conveniently for use and ready access when repairs are needed.

In the accompanying drawings, which form a part of this application, Figure 1 shows in elevation my improved liquid-dispensing apparatus as installed for use in drawing beer. Fig. 2 is a view in front elevation of the faucet forming a part of my invention and its air-pipe connections. Fig. 3 is a longitudinal section through the said faucet and an elbow connection therefor. Fig. 4 is a vertical section through the bung and its connections, also forming a part of my improved apparatus. Fig. 5 is a detail showing a cross-section through the bung attachment on the line $xx$ of Fig. 4. Fig. 6 is a detail showing a cross-section of the double-channeled beer and air conveying pipe.

Referring to the drawings in detail, A represents the faucet feature of my improved apparatus, the same being placed back of the bar.

E represents the bung element of the apparatus, which is attached to the keg as shown in Fig. 1, and C is the double-channeled pipe connecting the bung with the faucet and serving as a conduit for the air and the beer.

The faucet A comprises a tubular portion $a'$, through which extend a beer-channel and an air-channel, which are entirely separated by a longitudinal partition $a^2$. At the forward end of the faucet and forming a part thereof is an air-pressure gage B, of well-known form, comprising an expanding spring $b'$, a dial $b^2$, and a hand $b^3$, the air being admitted to said gage from an air-chamber $b^4$ in the faucet through an opening $b^5$ in the back of the gage. The specific form of the air-gage is immaterial, and any other construction than that shown may be used, the attachment to the body of the faucet being made in any suitable manner. Above the air-chamber $b^4$ and screwed into a circular threaded opening in the tubular portion $a'$ is a dome D, in which is housed the air-admission-regulating device hereinafter described.

Said dome is composed of a collar $d'$, threaded at its lower edge to screw into the opening $a'$ of a cover $d^2$, screwed into the upper portion of the collar, and a hollow cap $d^3$, screwed into the central threaded opening in the cover. A suitable opening through the side of the collar admits an air-inlet pipe M, which connects with a suitable air-storage tank $m'$. The end of the air-pipe within the dome is bent downwardly, as at $m^2$, and on the outside of the faucet is a stop-cock $m^3$, by which the air can be shut off from any faucet without interfering with others connected with the same main-supply air-pipe $m^4$, which leads to the tank $m'$.

The air-regulating device is composed of a circular and flat flexible diaphragm G, having its edges supported and held between the edges of the collar $d'$ and the cover $d^2$. The center of the diaphragm is perforated, and the hole is surrounded on the lower side with a washer $g'$ and on the upper side with an inverted cup $g^2$, into which projects the vertical stem $g^3$ of a yoke $g^4$, the lower end of which has an enlarged extension with a vertical threaded opening therethrough. Into said opening a screw $g^5$ is inserted, upon the upper end of which is secured a small disk of rubber or leather, adapted to close the opening in the pipe $m^2$ when the yoke is moved upwardly by the corresponding flexion of the diaphragm to which the stem of the yoke is secured. Normally the diaphragm is flexed downwardly by the spring $g^6$, the lower end of which bears against the peripheral flanges of the cup $g^2$. When the air-pressure is in excess of the amount required to force the beer up through the pipes, the diaphragm will be flexed upwardly by the pressure thereon exceeding the resistance of the spring $g^6$, and the yoke will be raised, so as to bring the disk on the end of the screw against the end of the pipe $m^2$, thus shutting off the supply of air to the faucet. The vertical play of the yoke is controlled by the adjustability of the screw in the lower portion of the yoke, and the tension of the spring is modified by screwing upwardly or downwardly the cap $d^3$, as will be readily apparent.

Screwed into the forward end of the faucet and communicating with its beer-channel is a nozzle $a^3$, supplied with a suitable cock $a^4$, through which the beer is drawn. The faucet is inserted in a suitable support or partition $a^5$, on the front side of which is a sleeve $a^6$, surrounding the faucet and screwed thereon at $a^7$, and a jam-nut $a^8$ secures the faucet in position. At the rear end of the faucet a double-channeled elbow F is secured by a coupling $f'$ and communicates with the double-channeled pipe C, which passes through an ice-box $c^2$, where it is coiled, and leads to the kegs in the cellar, which are supplied with my improved bung E and coupling device H. The bung is provided with an internally-threaded neck $e'$, into which is screwed the coupling device H, and is formed with an elbow $e^2$, with which the air-tube $e^3$ and the check-valve $e^4$ are connected. The air-tube $e^3$ is connected by a suitable coupling with an elbow $e^5$, which is screwed into an opening in the side of the bung and pipe-coupler H. The latter is cylindrical and formed with a central passage-way $h'$ for the beer and an annular chamber $h^2$, surrounding said central passage. The coupler H is connected with the pipe or tubing C by a union $h^3$, formed in two parts which fit over and around the adjacent edges of the coupler and pipe C. The lower end of the pipe is formed with a flaring extension $c'$, which rests upon the grooved edge of the interior wall $h^4$ of the coupler H. When the parts are assembled, the air-chamber in the pipe C communicates with the air-chamber $h^2$ in the coupler H without reference to the position to which the latter is turned, as will be seen in Fig. 4. The beer-tube J is arranged in the bung E and extends to the bottom of the beer-keg in the usual manner. Various modifications may be made in the details of construction and arrangement of this portion of the apparatus without affecting the principles embodied in the construction shown. As the pipe C is rigid and fixed, it is necessary to provide a certain amount of vertical adjustability in the means for connecting the bung and pipe, as some kegs are higher than others, and any other means of accomplishing this than the threaded joints shown may be utilized.

As the pipe C conveys both beer and air, the latter will be cooled in the ice-box before being conducted to the beer, thus keeping a volume of cold air on the liquor at all times. The position of the air-gage on the faucet enables the attendant to see at all times just how much air-pressure is on the beer, so that he can increase or diminish the supply, as required, by manipulating the cock $m^3$. By conducting the air and beer through a common pipe it is necessary to bore but one pipe-hole for each keg and faucet.

Having thus described my invention, what I claim as new, and desire to secure by Letters Patent, is—

1. In an apparatus for dispensing beverages, a faucet having an air-channel and a liquid-channel therein, means for automatically regulating the admission of air to said air-channel from a suitable source of air-supply under pressure, an air-pressure gage communicating directly with said air-channel, a single pipe having formed therein a liquid-channel and an air-channel communicating respectively with like channels in the faucet, a bung having ways therein for air and liquid respectively and an adjustable device for coupling said bung and pipe, said device having an air-channel and a liquid-channel communicating respectively with like channels in the pipe, and bung, as set forth.

2. In apparatus of the character described, a bung having an air-channel and a liquid-channel therein, a back-pressure valve located in its air-channel, a conduit-pipe having formed therein two channels for air and liquids respectively, a coupling device having a central liquid-channel and an annular air-channel and an adjustable connection between the air-channel of the coupling and the air-channel of the bung, as set forth.

3. In apparatus of the character described, a faucet having therein air-chamber, air-channel and liquid-channel, means for regulating the admission of air under pressure to said chamber, an air-pressure gage secured to the faucet and communicating directly with its air-chamber, a conduit-pipe having formed therein air-channel and liquid-channel, a bung having air-channel and liquid-channel therein, and couplings for connecting said faucet, conduit-pipe and bung whereby their respective chambers will register with each other.

4. In an apparatus of the character described, a faucet comprising an air-chamber at its front end, means for regulating the admission of air to said chamber from a suitable source of supply under pressure, an air-channel leading from said chamber, an air-pressure gage secured to the front of the faucet and communicating with said air-chamber, a liquid-channel extending longitudinally and vertically through said faucet and separated from the said air-channel and air-chamber, and means for controlling the outflow of liquid from said liquid-channel substantially as set forth.

In testimony whereof I affix my signature in presence of two witnesses.

HERMAN SCHEPKE.

Witnesses:
L. G. SNOW,
FREDERICK BENJAMIN.